United States Patent
Vogler et al.

(10) Patent No.: US 10,124,519 B2
(45) Date of Patent: Nov. 13, 2018

(54) METHOD FOR THE PRODUCTION OF HYBRID PARTS

(71) Applicant: NOLAX AG, Sempach Station (CH)

(72) Inventors: Christian Vogler, Eschenbach (CH); David Koch, Bern (CH); Bruno Traber, Münsingen (CH)

(73) Assignee: Nolax AG, Sempach Station (CH)

( * ) Notice: Subject to any disclaimer, the term of this patent is extended or adjusted under 35 U.S.C. 154(b) by 67 days.

(21) Appl. No.: 15/100,774

(22) PCT Filed: Dec. 17, 2014

(86) PCT No.: PCT/EP2014/078154
§ 371 (c)(1),
(2) Date: Jun. 1, 2016

(87) PCT Pub. No.: WO2015/091606
PCT Pub. Date: Jun. 25, 2015

(65) Prior Publication Data
US 2016/0303781 A1    Oct. 20, 2016

(30) Foreign Application Priority Data
Dec. 20, 2013 (EP) .................................. 13198963

(51) Int. Cl.
*B29C 45/14* (2006.01)
*B29C 45/40* (2006.01)
(Continued)

(52) U.S. Cl.
CPC .... *B29C 45/14311* (2013.01); *B29C 45/1418* (2013.01); *B29C 45/40* (2013.01);
(Continued)

(58) Field of Classification Search
CPC ........... B29C 45/14311; B29C 45/1418; B29C 45/14; B29C 45/1657; B29C 2045/14286; B29C 65/70
(Continued)

(56) References Cited

U.S. PATENT DOCUMENTS 4,923,539 A * 5/1990 Spengler ................. B29C 33/18
156/212
5,531,950 A * 7/1996 Kimura ............... B29C 37/0078
264/135

(Continued)

FOREIGN PATENT DOCUMENTS

DE    103 26 995 A1    1/2005
DE    103 61 096 A1    7/2005
(Continued)

OTHER PUBLICATIONS

Machine translation of JP 05-269787 date unknown.*
(Continued)

*Primary Examiner* — John L Goff, II
(74) *Attorney, Agent, or Firm* — Davis & Bujold PLLC; Michael J. Bujold (57) ABSTRACT

A method for producing hybrid parts (1) and to the uses of a ram (11) and an adhesive layer (21) that is to be applied to a part (2) during the production of the hybrid parts (1). The method for producing hybrid parts (1) is cost-effective and time-efficient.

18 Claims, 10 Drawing Sheets

(51) Int. Cl.
  *B29C 65/02* (2006.01)
  *B29C 65/48* (2006.01)
  *B29L 31/30* (2006.01)
  *B29K 705/00* (2006.01)
  *B29K 105/06* (2006.01)

(52) U.S. Cl.
  CPC .............. *B29C 65/02* (2013.01); *B29C 65/48* (2013.01); *B29C 2045/14286* (2013.01); *B29K 2105/06* (2013.01); *B29K 2705/00* (2013.01); *B29K 2715/006* (2013.01); *B29L 2031/3002* (2013.01)

(58) Field of Classification Search
  USPC ........................................ 156/242, 245, 293
  See application file for complete search history.

(56) References Cited

U.S. PATENT DOCUMENTS

| | | | | |
|---|---|---|---|---|
| 5,851,558 | A | * | 12/1998 | Atake ................ B29C 45/1418 264/328.12 |
| 8,414,813 | B2 | | 4/2013 | Jung et al. |
| 8,673,191 | B2 | | 3/2014 | Agerer et al. |
| 8,974,713 | B2 | | 3/2015 | Kroll et al. |
| 2005/0016659 | A1 | | 1/2005 | Hoogland |
| 2006/0090842 | A1 | | 5/2006 | Chervin |
| 2010/0089792 | A1 | | 4/2010 | Bryant, Jr. |
| 2011/0089792 | A1 | | 4/2011 | Casebolt et al. |
| 2011/0123816 | A1 | | 5/2011 | Husemann et al. |
| 2012/0008271 | A1 | * | 1/2012 | Bhutani ............ B29C 45/14811 361/679.31 |
| 2015/0017452 | A1 | * | 1/2015 | Schmitz-Stapela ....... B32B 7/12 428/425.8 |

FOREIGN PATENT DOCUMENTS

| | | | | |
|---|---|---|---|---|
| DE | 10 2006 001 340 | A1 | | 7/2007 |
| DE | 102006037997 | A1 | * | 2/2008 ............. B29C 43/18 |
| DE | 102012203249 | A1 | * | 9/2013 ............... B32B 7/12 |
| EP | 2 004 380 | B1 | | 6/2011 |
| EP | 2 403 698 | B1 | | 7/2013 |
| EP | 2 328 734 | B1 | | 8/2013 |
| JP | 05269787 | A | * | 10/1993 ....... B29C 45/14311 |
| WO | 9311924 | A1 | | 6/1993 |
| WO | 2005/061203 | A1 | | 7/2005 |
| WO | 2006082006 | A1 | | 8/2006 |
| WO | 2008/140143 | A1 | | 11/2008 |
| WO | WO2010/000483 | A1 | | 1/2010 |

OTHER PUBLICATIONS

European Office Action issued in corresponding European Patent Application No. 14 812 559.4 dated May 30, 2017.
M. Fedler, "Eine Starke Verbindung", Plastverarbeiter, Huethig gmbH, Heidelberg, Germany, Jan. 1, 2009, pp. 22-23, XP008119146, English Abstract.
European Search Report Corresponding to 13198963.4 dated Sep. 16, 2014.
International Search Report Corresponding to PCT/EP2014/078154 dated Mar. 4, 2015.
Written Opinion Corresponding to PCT/EP2014/078154 dated Mar. 4, 2015.

* cited by examiner

METHOD FOR THE PRODUCTION OF HYBRID PARTS

The invention relates to a method for the production of hybrid parts, and to the use of a press ram and of an adhesive film in the production of hybrid parts.

Hybrid parts of metal and plastics material make a significant contribution toward lightweight automotive construction. Here, a deep-drawn and perforated steel panel is laid up in an injection-molding tool and overmolded with glass fibers, using a suitable plastics material, for example polyamide (PA6.6). Here, a plastics-material melt penetrates through punched openings in the sheet-metal panel, forming a swage head between a mold-cavity wall of the tool and a laid-up metal part. A force-fitting and form-fitting connection between the two components is created in this way. Thin-walled steel constructions may be stabilized by molding rib-shaped reinforcements and strengthenings of plastics material, while adding little additional weight. In addition to the strengthening ribs, hybrid technology offers the possibility for arbitrary additional functions such as, for example, fastening elements, mounting points, snap-fit hooks, screw connections, cable clamps to be integrated in one operational step. On account thereof, it is possible for time and cost-intensive post-processing and fitting processes to be saved. In order for the performance of the components to be enhanced, the development of hybrid parts includes materially integral connections between metal and plastics material.

Such a firmly bonded connection between a composite component having a metallic layer and at least one layer which is composed of a thermoplastic polymer is described in DE 103 26 995 A1. An intermediate layer which is applied by means of a spraying, injection-molding, or pressing method is provided between the metallic layer and a plastics-material layer.

DE 103 61 096 likewise describes a firmly bonded connection of a component which in regions is made of metal. The metal here is partially overmolded with thermoplastic plastics material, one or a plurality of adhesion promoting layers being configured on parts of the metal. Said adhesion promoting layers are inter alia applied by means of varnishing.

It is disadvantageous in the case of the abovementioned methods for the production of hybrid parts that the metallic layer has to be pre-coated with an adhesion promoting layer and subsequently to be placed in intermediate storage prior to any further processing being performed. Apart from complex logistics, this requires a temporal interruption of the production process.

Furthermore, the known methods for the production of hybrid parts, for example the coil coating method, have disadvantages such as, for example, a separate pre-coating process, a required drying process, solvent-containing systems, multi-stage coating methods, and only coatings which cover the entire area.

In the case of spray-type application methods, additional method steps are most often required, and coating involving any recess is only possible by means of complex masking of the component. Typically, an accumulation of the adhesion promoting agent results in corners and along edges of the component, rendering the process inefficient in terms of material input.

It is thus an object of the invention to overcome the disadvantages of the prior art.

In particular, it is an object of the invention to provide a method in which a materially integral connection is performed so as to be integral to the process, and thus an adhesion promoting agent, for example an adhesive layer, is applied so as to be integral, to the process.

These objects are achieved by the features stated in the independent claims.

The invention relates to a method for the production of hybrid parts, the method comprising the following steps:

providing an in particular pre-formed component, in particular a metal element;

providing a tool, in particular an injection-molding tool or a pressing tool;

providing at least one application unit, in particular a press pistil;

providing at least one adhesive layer, in particular an adhesive film, on the application unit;

placing the in particular pre-formed component in the tool;

heating the tool in particular by means of a temperature-control device, or heating the component prior to placing in the tool (3, 3');

pressing the adhesive layer onto the in particular pre-formed component;

closing the tool;

introducting a plastics material, in particular one or a plurality of plastics-material ribs or plastics-material struts into the tool, in particular by injection-molding or pressing;

removing the hybrid part from the tool.

In this way, an adhesive layer is applied onto the component, in particular onto the metal element, in a manner which is integral to the process such that pre-coating steps on the component and drying steps for the adhesive layer, including intermediate storage, are obsolete. Likewise, the release of solvents into the environment is avoided since the method does not require any drying. Moreover, it is advantageous that, the introduction of the plastics material, in particular by injection molding, is performed immediately upon application of the adhesive layer, the production process of a hybrid part thus being optimized and accelerated. The supply chain is thus significantly curtailed. Further advantages comprise the simple implementation of a partial coating by means of the selected profile of the adhesive layer. Advantageous conditions for further processing, such as, for example, welding in regions of recesses, joining by clinching, and metal-to-metal adhesive bonding while avoiding double layer thicknesses, result therefrom. Likewise, an application of multi-layered adhesive layers for various substrate combinations and of uniform layer thicknesses is readily implementable. In particular, the use of a press pistil in the method is advantageous since partial coating of pre-formed components is simplified in this way. Using a pistil, complex three-dimensional structures may be partially coated in an efficient manner. To this end, a pistil matching the three-dimensional structure of line pre-formed component is used.

The use of pre-formed components, in particular sheet-metal panels, is particularly advantageous since the usual temperature which is applied when forming sheet-metal panels is above 100° C. Accordingly, if a pre-formed component is used in the method according to the invention, the coating is not exposed to the high forming temperatures. Forming of an already coated component, in particular of a sheet-metal panel, is disadvantageous since, on account of the high energy input, the coating is heated and cooled during forming, indeed compromising the properties of the former. The method according to the invention thus enables efficient coating of components in the production of hybrid, parts, whereby the properties of the coating is not compromised by a temperature cycle which is usually applied when forming a component, in particular a sheet-metal panel. Thinning of the coating by forming, for example by deep drawing, may thus be avoided.

Figure 6:
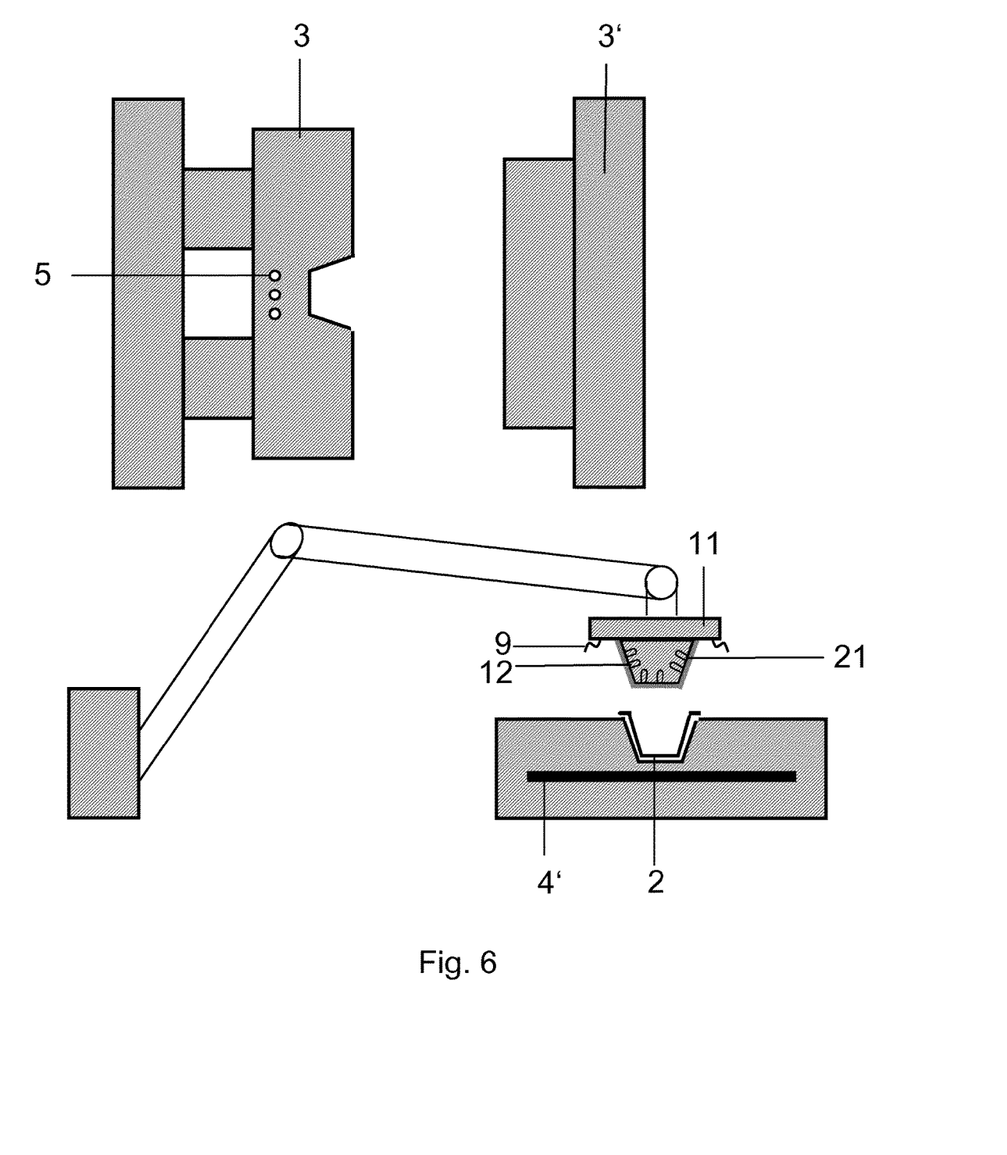
FIG. 6: shows a schematic illustration of various elements for carrying out an alternative method, having a positionable external heat source.
Figure 7:
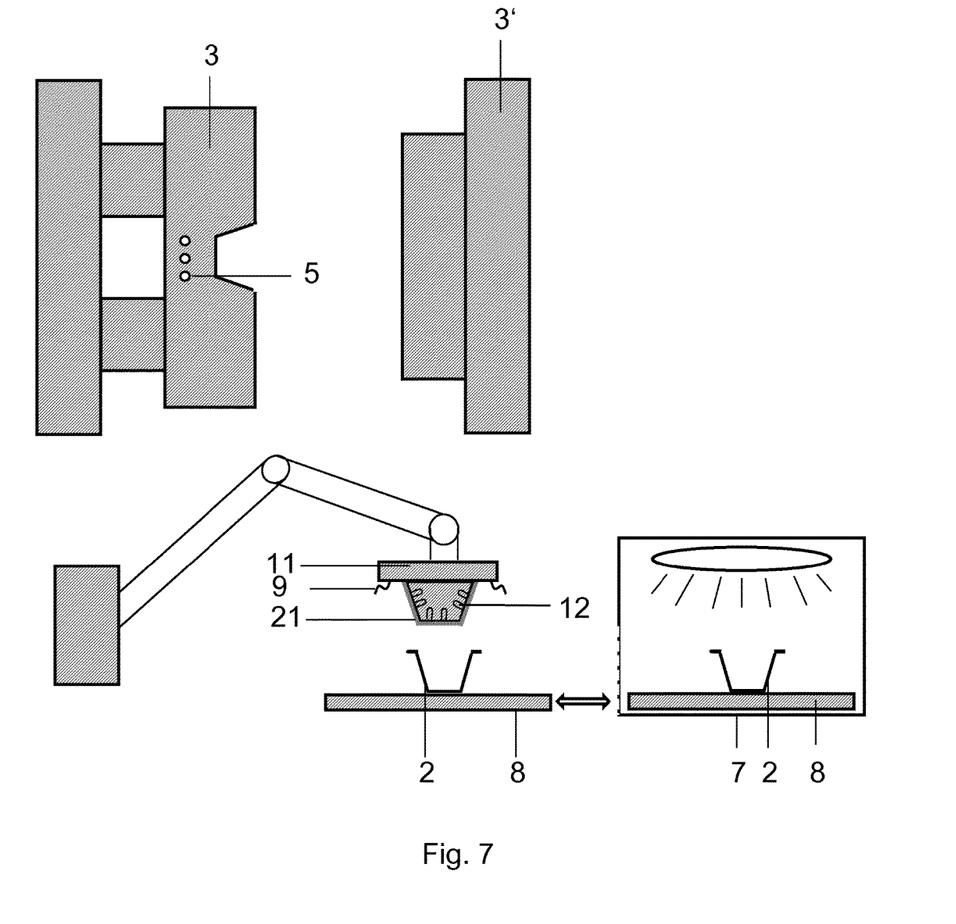
FIG. 7: shows a schematic illustration of various elements for carrying out an alternative method, having a separate heating oven.

Heating of the tool, in particular by means of a temperature-control device, prior to placing the in particular pre-formed component is understood to be heating of the component in a device (said device potentially also being a tool or part thereof) or a heating element which is separated from the tool. Subsequently, the heated and in particular pre-formed component is placed in the tool. A separated device is shown in FIG. 6 and described in the respective description of the figure. A separated heating element in the form of a heating oven is shown in FIG. 7 and described in the respective description of the figure.

An adhesive layer, in particular an adhesive film, hereunder is understood to be adhesive per se or to be adhesive upon activation, for example upon heating.

A component is understood to preferably include sheet-metal panels, in particular steel panels or aluminum panels. Said component is likewise understood to preferably include plastics-material or carbon elements.

It goes without saying that pre-treated, in particular pre-formed, components may also be used. Here, requirement-related coatings, such as, for example, a cathodic dip coating, an anodic oxidation, an etching, conversion and passivation layers (alkali phosphating, zinc phosphating, iron phosphating, manganese phosphating, conversion layers based on titanium, zirconium, and silane), nano-coatings, an electro galvanization, a hot-dip galvanization, an anti-corrosion primer, may be applied. Here, forming, for example deep drawing, of a component, followed by coating using one of the above-mentioned requirement-related coatings, and finally, as has been described above, applying an adhesive layer and introducing a plastics material, is particularly advantageous.

It goes without saying that the methods steps of heating the tool, in particular by means of the temperature-control device, and pressing the adhesive layer onto the in particular pre-formed component, are inter changeable in terms of sequence thereof and are adaptable in terms of time. In this way, properties of the adhesive layer, such as, for example, melting properties, development of adhesion and/or the temporal profile of a development of adhesion, or of the component, such as, for example, thickness and/or thermal conductivity, may be considered.

The adjustable temperature-control device which comprises a heating unit and a cooling unit enables active heating and/or cooling. Heating resistors may be sunk into a bearing face of the tool. In this way, the tool is adjustable to a defined temperature. The temperature-control device here may have an in particular pulsed cola temperature-control medium, combined with an electrical resistor heating, a heating radiator, a water-cooled inductor. Likewise, an inductor may be enclosed by an in particular pulsed cold temperature-control medium. Alternatively, hot and cold temperature media may be used alternatingly in a circulation system. These hot and cold temperature-control media here may have a combination of water with water, oil with oil, steam with water.

By heating the tool to a defined temperature, adhesion of the adhesive layer to the component is enabled such that a controlled application of the adhesive layer onto the component may be performed.

The tool may further comprise one or a plurality of temperature sensors. Temperature values which have been detected may be considered for regulating or controlling the method, in particular the temperature in the tool.

Applying the plastics material, in particular by back injection-molding, may comprise the steps of injecting, dwelling pressure, and cooling, Alternatively, the plastics material may be introduced by a pressing method, a fused deposition modelling method, extrusion, foaming, or casting.

The method is not restricted to the production of a hybrid part from a combination of metal and plastics material. Metal-metal, carbon-carbon, plastics material-plastics material, or metal-carbon hybrid parts are also possible. These combinations are implemented by pressing methods, foaming methods, casting methods, or fused deposition modelling/extrusion methods, incompatible materials, in particular incompatible plastics materials, may be interconnected in this manner.

The adhesive layer may be provided as a two-dimension contour of the three-dimensional and in particular pre-formed component. Here, the in particular pre-formed component may be designed in particular with at least one or a plurality of recesses. In this manner, further processing steps such as, for example, spot welding, clinching, are capable of being carried out in the regions of the recesses of the adhesive layer.

The in particular pre-formed component may be produced by means or punching, bending, forming, deep drawing, pressing, foaming, casting, or fused deposition modelling/extrusion.

The in particular pre-formed component may be pre-treated, in particular de-greased. In this manner, the component is adapted in a requirement-relevant and function-relevant manner. Pre-treating may comprise applying in particular a primer layer and/or a plasma layer. The in particular pre-formed component may likewise be pre-treated by a laser.

The press pistil may have at least one or a plurality of vacuum bores which enable suctioning of the adhesive layer. Vacuum bores here are understood to be recesses on one side or face, respectively, of the press pistil. Upon placing the press pistil onto an element, for example an adhesive layer, negative pressure within the recesses may be built up in this way by downstream means such as, for example, a vacuum, pump, enabling adhesion of the element, in particular of the adhesive layer, to the press pistil. Suctioning, applying, and releasing an element, in particular an adhesive layer, may be controlled in this manner.

Adhesion of the adhesive layer to the in particular pre-formed component may be enabled by means of temporary fixing, in particular by means of electrostatic attraction or by an adhesive pre-coating of the in particular pre-formed component. Here, a contact face between the component and the adhesive layer has higher adhesion than a contact face between the press ram and the adhesive layer. On account thereof, adhesion of the adhesive layer to the component is enabled. An adhesive pre-coating is understood to be an adhesive coating which has previously been applied to the component and which supports adhesion of the adhesive layer.

If adhesion of the adhesive layer to the press pistil is imparted by negative pressure applied thereto, the negative pressure may thus be reduced, and adhesion of the adhesive layer to the component may thus be performed. Likewise, positive pressure may be applied in order for the film to be released from the pistil. Furthermore, spring-mounted pins which pierce the adhesive layer may also be utilized. Handling and transferring may be likewise performed in this manner.

The tool, during introduction of a plastics material, may be temperature-controlled, in particular by moans of the temperature-control device, and in particular adjusted to a defined temperature. In this manner, the introduction of the plastics material may be optimized, in particular in terms of uniform distribution of the incorporated plastics material. Likewise, the temperature-control device may be controlled or regulated in a requirement-relevant manner.

The in particular pre-formed component and/or the adhesive layer, prior to the introduction of a plastics material, may be heated by means of infrared radiation, high-frequency radiation, or hot air. In the case of the component containing metallic components, the former may likewise be temperature controlled by means of induction or other methods. In this manner, both elements may be adjusted to a temperature which is optimal in terms of adhesion of the adhesive layer to the component.

The adhesive layer may also have metallic component parts. In this way, the adhesive layer is heatable by means of induction.

The adhesive layer may be configured to be single-layered or multi-layered, preferably triple-layered or quintuple-layered. Desirable properties may be incorporated into the adhesive layer in this manner. These properties comprise in particular dissimilar adhesive properties, resistance properties, flow properties, viscosities, melting temperatures, melting-temperature ranges, temperature resiliencies, tacking properties, wetting behavior.

The adhesive layer may in particular have latently reactive groups. A temporally delayed configuration of a materially integral connection is enabled in this manner.

The adhesive layer may be applied onto a transfer carrier. A transfer carrier here may be a transfer film, for example. Adhesion of the adhesive layer to the press pistil may be prevented by means of a transfer carrier, in particular of a transfer film. During the pressing procedure, the transfer carrier acts as a separation layer. The transfer carrier is removed prior to the incorporation of the plastics material. Transfer carriers may be made of polyethylene, polypropylene, polyethylene terephthalate, polyolefin, polyamide, PPA, polyester, polysiloxane/silicone, PTFE, TPU, cellulose hydrate/cellophane, cellulose acetate, cellulose, viscose, PBT, PC, ABS, PEEK, POM, ASA, SAN, PAN, PVC, PS. Other materials for manufacturing are known to the person skilled in the art. In general, the transfer carrier may be composed of thermoplastic plastics materials and non-adhesive materials. Here, the transfer carrier and the adhesive layer are not mutually adhesive. While the adhesive layer readily adheres to the transfer carrier, the former may be peeled from the latter with ease. In this way, the transfer carrier may be removed without issues after the coating procedure.

The adhesive layer may be applied onto the carriers daring the production process. These carriers may also be conjointly produced during the production process of the adhesive layer (film carriers).

Transfer carriers from silicone-treated paper are suitable for a method using a planar (two-dimensional) pistil.

Furthermore, a semi-finished textile product, in particular mats, non-woven fabrics, cross-laid structures, woven fabrics, braided fabrics, or knitted fabrics may be used as a carrier. The latter remains in the system while the plastics material is incorporated, representing an intermediate layer between the plastics material and the adhesive layer.

The adhesive layer may have a layer thickness from 1 to 2000 µm, preferably from 5 to 1000 µm, more preferably from 10 to 500 µm. The adhesive layer is preferably elastic and during deep drawing results in a uniformly thinned adhesive layer. In this manner, the adhesive layer is capable of being applied onto a component which is subsequently formed, in particular is deep drawn.

The adhesive layer is likewise preferably adaptable using punching and/or cutting tools. In this manner, the adhesive layer may be adapted in a requirement-relevant manner, in particular to the dimensions of a component.

A layer of the adhesive layer that faces the in particular pre-formed component may be made using materials selected from the list comprising: polyolefins, in particular in combination with maleic anhydride; polyamide, in particular in combination with phenol; polyurethane, in particular latently reactive polyurethane; phenolic resin; polyester, in particular copolyester; ethylene vinyl acetate, ethylene vinyl alcohol, ionomers, acrylates, silanes, epoxides. Further well-established plastics materials are known to the person skilled in the art, the abovementioned list thus not being final. In this way, the layer has a melting range from 60 to 250° C., preferably 80 to 230° C., more preferably 100 to 220° C.

A layer of the adhesive layer that faces the press pistil may be made from materials selected from the list comprising polyolefins, in particular in combination with maleic anhydride; polyamide, in particular in combination with phenol; thermoplastic polyurethane (TPU), polybutylene terephthalate (PBT), polyphtalamide (PPA), polycarbonate (PC), acrylonitrile butadiene styrene (ABS), polyether ether ketone (PEEK), polyoxymethylene (POM), acrylonitrile styrene acrylate (ASA), styrene acrylonitrile resin (SAN). Further well-established plastics materials are known to the person skilled in the art, the above-mentioned list thus not being final. In this way, the layer has a melting range from 80 to 350° C., preferably 100 to 300° C., more preferably 110 to 250° C.

A layer of the adhesive layer that faces the in particular pre-formed component may have an adhesion to the component in such a manner that the adhesive layer may be transferred onto the component at a contact pressure time of 0.1 to 60 seconds, preferably 0.1 to 30 seconds, particularly preferably 0.1 to 15 seconds, and at a pressure of 0.001 to 100 bar, preferably 0.001 to 80 bar, particularly preferably 0.001 to 50 bar.

The back injection-molded hybrid part may be covered with a coated sheet-metal cover, in particular may be connected thereto in a firmly bonded and form-fitting manner. The coated sheet-metal cover may have an adhesive layer and in this way together with the hybrid part may configure a composite, in particular by means of an adhesively bonded connection between two adhesive layers.

The hybrid part is covered in this manner, or further elements may be connected to the hybrid part in particular in a firmly bonded and form-fitting manner, respectively. It goes without saying that a sheet-metal cover which is free of an adhesive layer may be applied onto the hybrid part. Here, a firmly bonded and form-fitting connection is performed by means of the adhesive layer which has previously been incorporated into the component.

Furthermore, hybrid parts may be produced by means of the method, wherein an in particular pre-formed component, in particular a sheet-metal panel, is supplied and is provided with an adhesive layer, as has been described earlier. In a further operational step, a fiber-composite material, preferably a semi-finished product, more preferably a semi-finished textile product, may be applied onto the composite of the component and the adhesive layer. Alternatively, a fiber-composite material, preferably a semi-finished product, more preferably a semi-finished textile product, may initially be applied onto the adhesive layer, and this composite may subsequently be rammed onto the in particular pre-formed component, in particular the sheet-metal panel. Alternatively, any preparation of the in particular pre-formed component may likewise be dispensed with, the adhesive layer, the fiber-composite material, preferably the semi-finished product, more preferably the semi-finished textile product, and the plastics material being successively applied onto the in particular pre-formed component. In this manner, hybrid parts which have the advantageous properties of an in particular metallic component and those of a plastics material are produced by the method according to the invention such that the hybrid part is distinguished by low weight yet high stability. The abovementioned fiber-composite material is understood here and hereunder to be organopanels, fiber-matrix semi-finished products, plastics materials which are reinforced with glass fibers, carbon fibers, polymer fibers, and natural fibers.

The invention furthermore relates to the use of a press pistil for applying an adhesive layer onto a component in the production of a hybrid part, in particular in a method as has been described above. In this manner, the production of a hybrid part is cost and time efficient.

The invention further relates to a use of an adhesive film for connection of a plastics material to a component in the production of a hybrid part, in particular in a method as has been described above.

By using a press pistil and/or by using an adhesive layer, in particular an adhesive film, the production of a hybrid part is cost and time efficient.

The invention will be discussed in more detail hereunder by means of images in which.

Figure 1A:
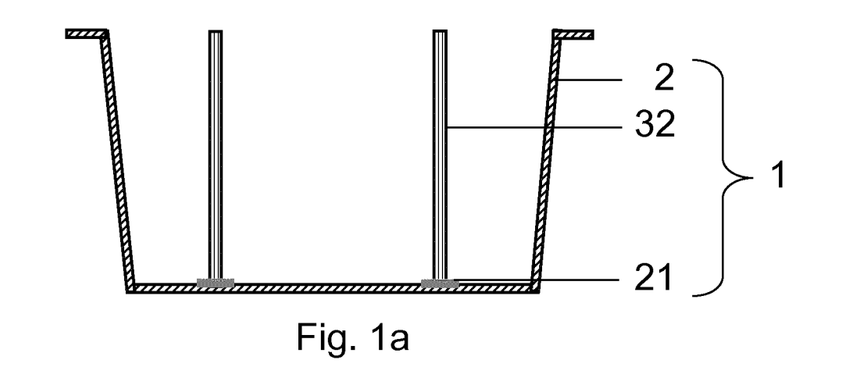
FIGS. 1a, 1b, 1c: show schematic sections through hybrid parts which have been produced in the method according to the invention.
Figure 1B:
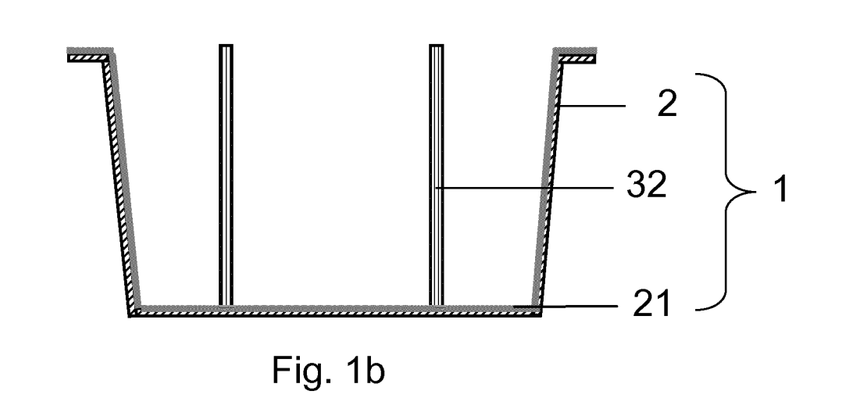
Figure 1C:
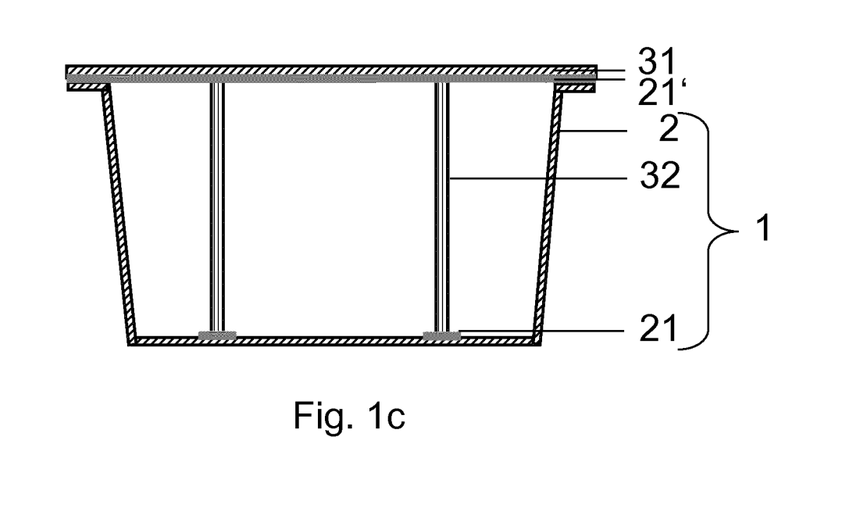

FIGS. 1a, 1b, and 1c show a hybrid part 1 comprising a component 2, an adhesive layer 21 which is designed to be partial, and one or a plurality of plastics-material ribs 32 (FIG. 1a). Here, the one or a plurality of plastics-material ribs 32 are connected to the component 2 by means of the adhesive layer 21. Alternatively, the component 2 may be completely or partially filled with a plastics material, the latter adhering to the component 2 by means of an adhesive layer 21. Alternatively, the adhesive layer 21 is designed to be across the entire area (FIG. 1b). Alternatively, the hybrid part 1 is coverable with a sheet-metal cover 31 which is attached to the component 2 by means of an adhesive layer 21' (FIG. 1c).

Figure 2A:
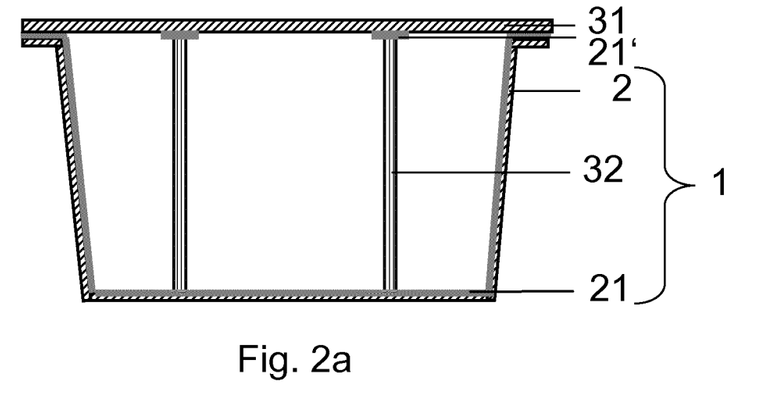
FIGS. 2a, 2b, 2c: show schematic sections through hybrid parts which have been produced in the method according to the invention.
Figure 2B:
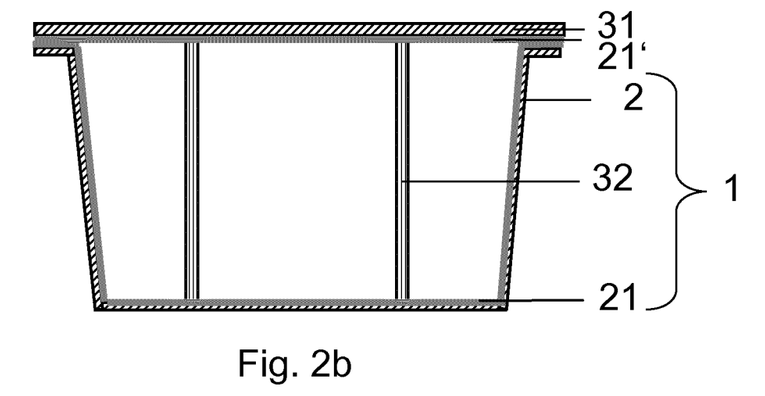

FIGS. 2a, 2b, and 2c shows hybrid parts 1 comprising a component 2, an adhesive layer 21, one or a plurality of plastics-material ribs 32, an adhesive layer 21', and one sheet-metal cover 31. The component 2 is coated with the adhesive layer 21 across the entire area, and the sheet-metal cover 31 in those contact regions that come to bear on the plastics-material ribs 32 is coated with the adhesive layer 21' (FIG. 2a). Alternatively, the sheet-metal cover 31 is coated with the adhesive layer 21' across the entire area such that the adhesive layers 21 and 21' in the external regions of the component 2 lie on top of one another.

Figure 2C:
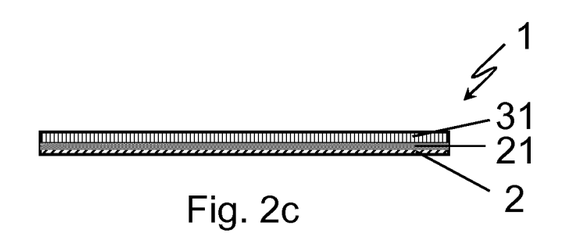

A planar illustration shows a hybrid part 1 comprising a component 2, an adhesive layer 21, and a sheet-metal cover 31, all lying on top of one another (FIG. 2c). Alternatively, the component 2 is fiber-reinforced. Accordingly, the abovementioned elements need not be pre-formed in a three-dimensional manner.

Figure 3:
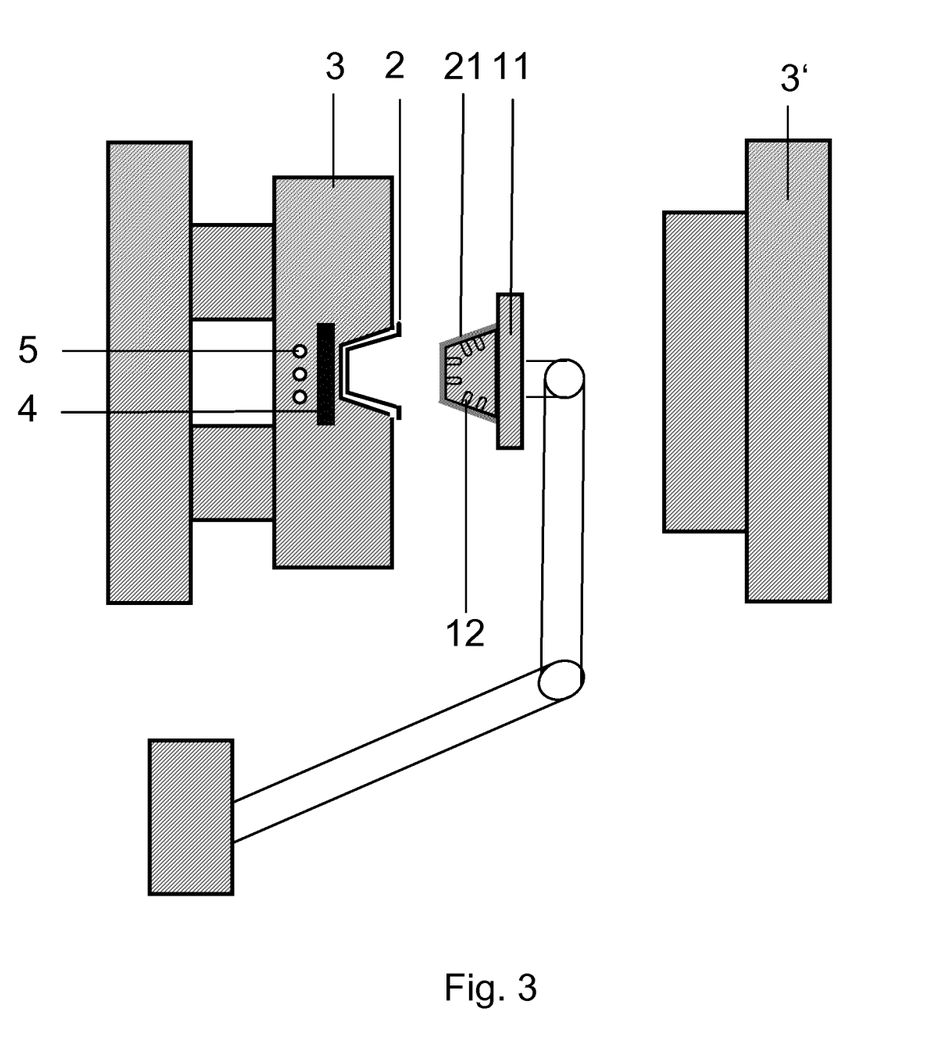
FIG. 3: shows a schematic illustration of various elements for carrying out the method according to the invention.

FIG. 3 shows various elements for carrying out the method according to the invention. A component 2 is laid up in a cavity of a tool 3. An adjustable temperature-control device which comprises a heating unit 4 and a cooling unit 5 heats the component 2 which is laid up in the cavity to a defined temperature. An adhesive layer 21 adheres to a press pistil 11. The press pistil has vacuum bores 12 which provide suctioning and releasing of the adhesive layer 21. The adhesive layer 21 is transferred to the component 2 by pressing. The press pistil 11 subsequently exits the tool 3, and a second element of the tool 3', which has an injection-molding installation, for example, fills the coated component 2 with a plastics material.

Figure 4:
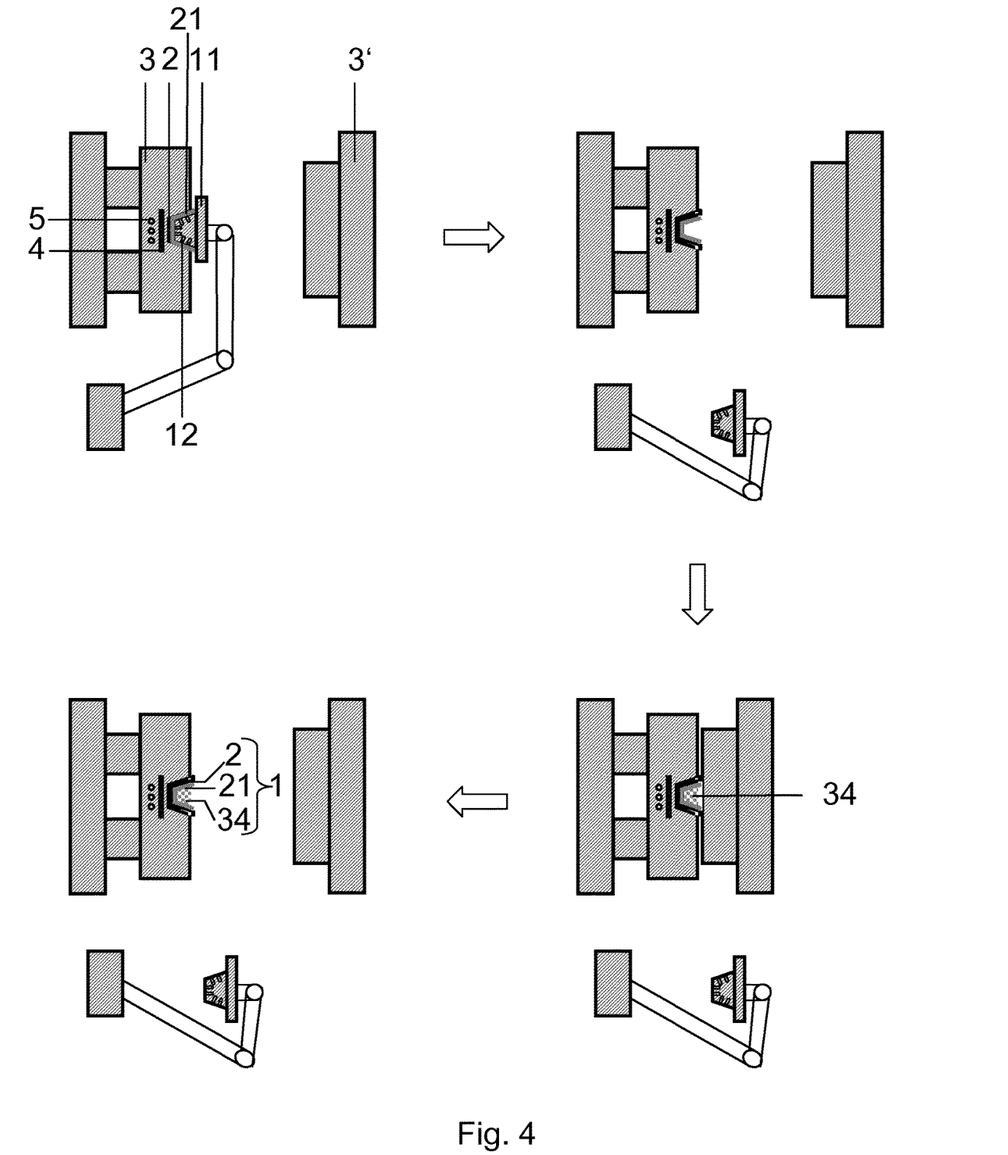
FIG. 4: shows a schematic illustration of a method according to the invention for the production of a hybrid part.

FIG. 4 shows a transfer by means of pressing an adhesive layer 21 by the pressing pistil 11, using negative pressure which is imparted through vacuum bores 12 to a component 2 which is temperature-controlled by means of a temperature-control device (heating unit 4 and cooling unit 5). The press pistil 11 exits the tool 3, a second element of the tool 3' closes the tool and introduces a plastics material 34 into the coated component 2. The tool is subsequently opened, and the hybrid part 1 may be removed from the tool 3, 3'. Alternatively, the hybrid part 1, prior to removal, may be covered with a sheet-metal cover (cf. FIGS. 8, 9, 10).

Figure 5:
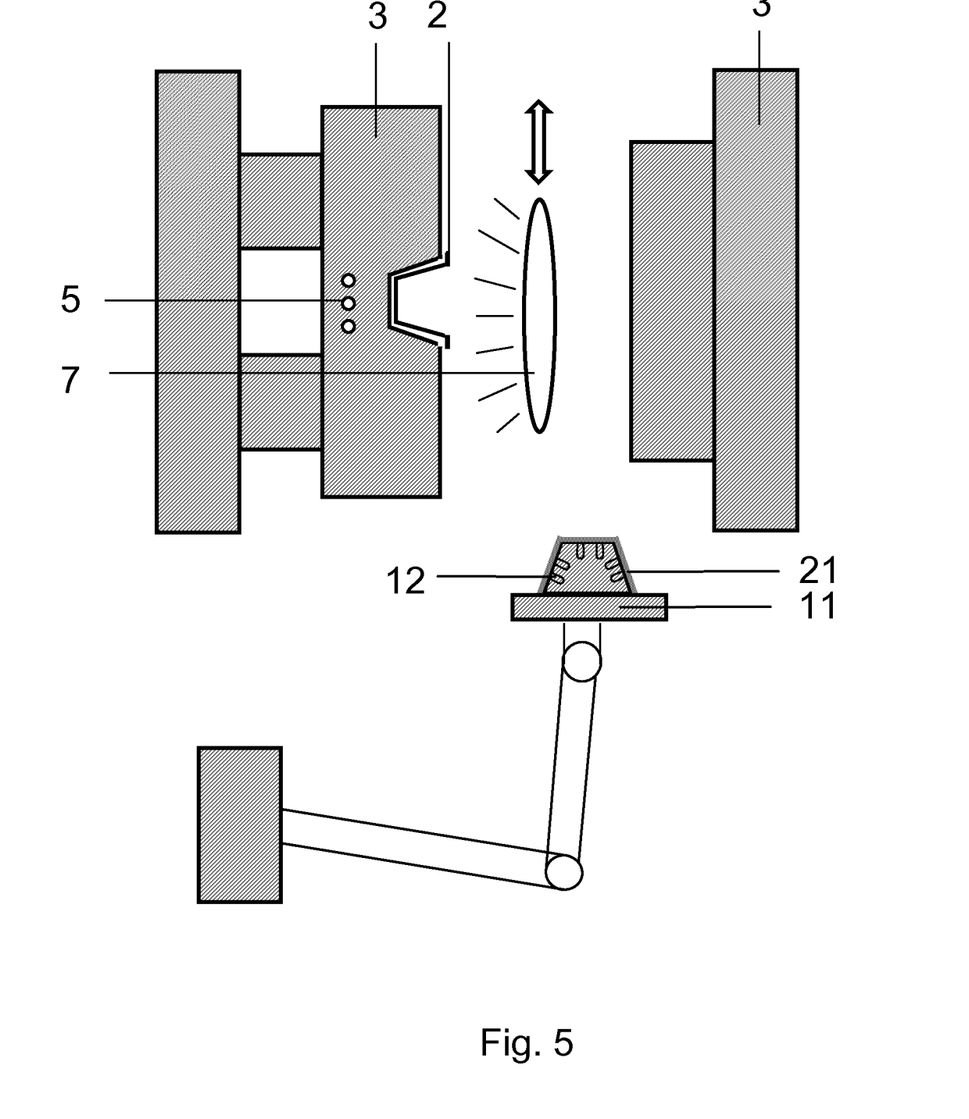
FIG. 5: shows a schematic illustration of various elements for carrying out an alternative method.

FIGS. 5, 6, and 7 visualize alternative possibilities for inputting energy to the component 2. A movable external heat source is moved into the tool 3, the component 2 which is located in the cavity of the tool 3 being correspondingly heated (FIG. 5). A cooling installation 5 enables the temperature in the tool 3 to be adapted in a requirement-relevant manner.

Alternatively, an additional tool having a cavity in which a component 2 is laid up is provided (FIG. 6). The component 2 by means of a heating unit 4' is brought to a defined temperature, a press pistil 11 which is coated with an adhesive layer 21 is pressed onto the component 2, and one or a plurality of transfer elements 9 engage with the component 2, enabling the component 2 which is coated with the adhesive layer 21 to be transferred into the cavity of the tool 3. Subsequently, the transfer tools 9 release the coated component 2, vacuum bores 12 release the adhesive layer 21 by reducing an applied negative pressure, the press pistil 11 exits the tool 3, and a second element of the tool 3' which has an injection-molding tool, for example, fills the coated component 2 with a plastics material. A cooling installation 5 enables the temperature in the tool 3 to be adapted in a requirement-relevant manner.

Alternatively, the component 2 is located on a slide 8 and is brought to a defined temperature in an external heating device 7, for example in an external heating oven (FIG. 7). The slide 8 moves out of the heating device 7, a press ram 11 which is coated with an adhesive layer 21, this being imparted by means of negative pressure applied through the vacuum bores 12, is pressed onto the component 2, and one or a plurality of transfer elements 9 engage with the component 2, enabling the component 2 which is coated with the adhesive layer 21 to be transferred into the cavity of the tool 3. Subsequently, the applied negative pressure is reduced in order for the adhesive layer 21 to be released, the transfer tools 9 release the coated component 2, the press pistil 11 exits the tool 3, and a second element of the tool 3' which has an injection-molding unit, for example, fills the coated component 2 with a plastics material. A cooling installation 5 enables the temperature in the tool 3 to be adapted in a requirement-relevant manner.

Figure 8:
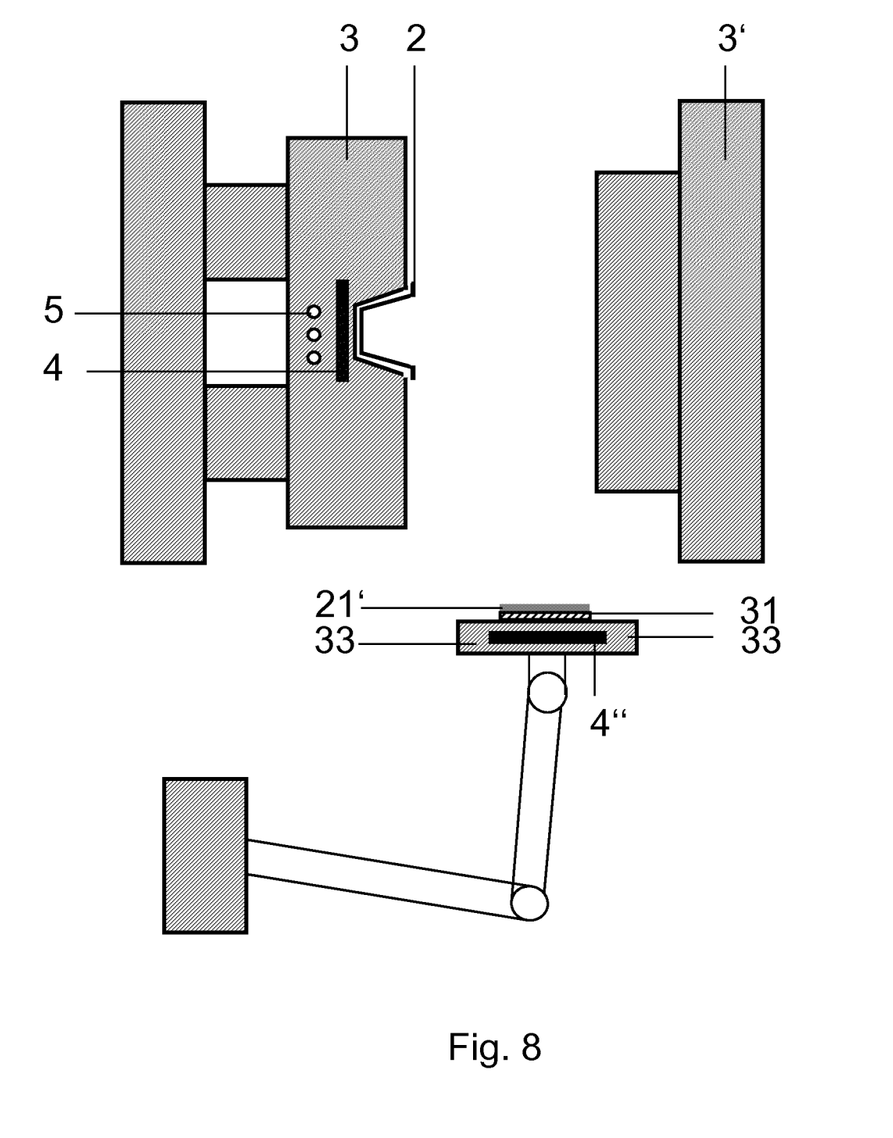
FIG. 8: shows a schematic illustration of various elements for carrying out an alternative method for closing a hybrid part.
Figure 9:
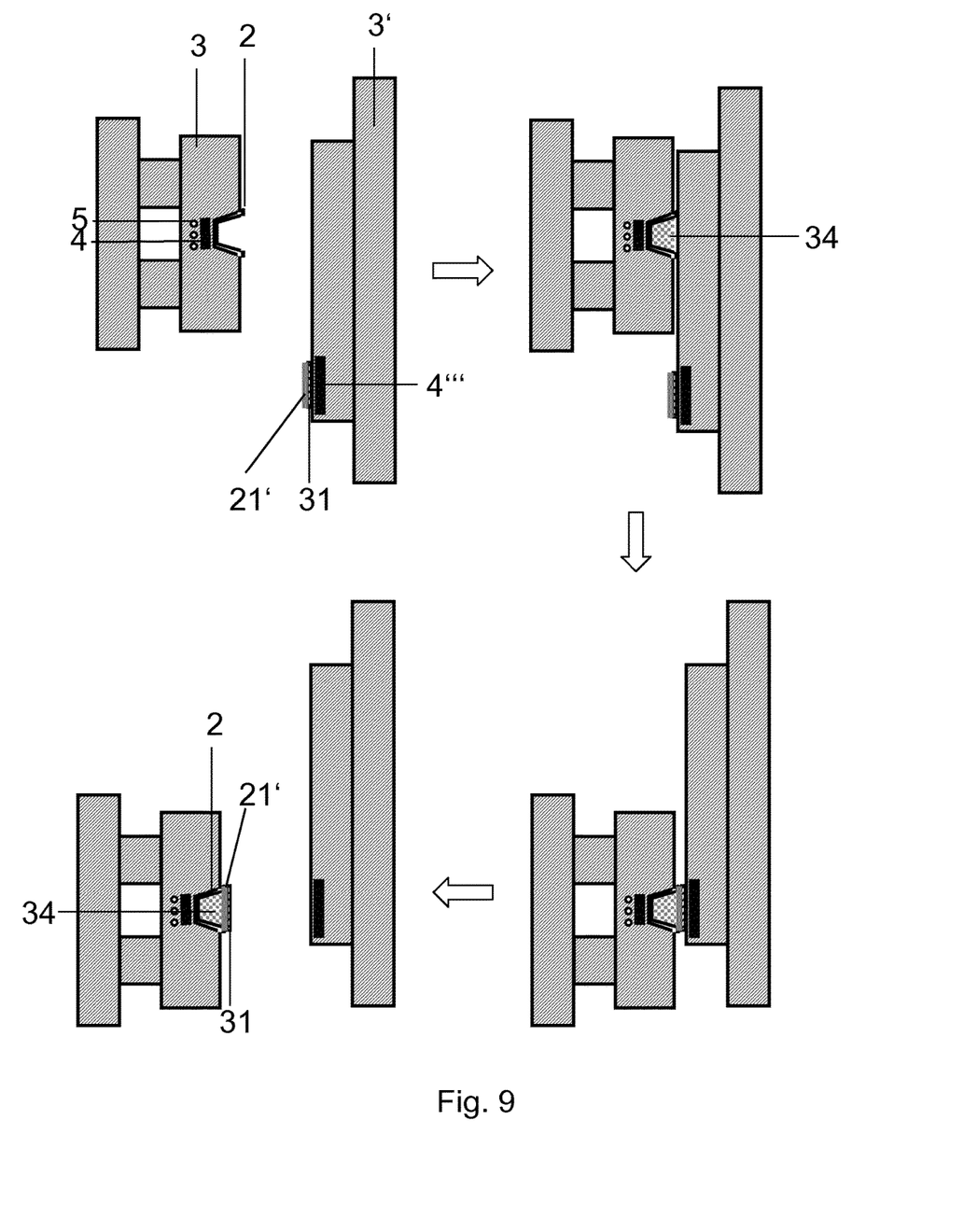
FIG. 9: shows a schematic illustration of an alternative method for closing a hybrid part.
Figure 10:
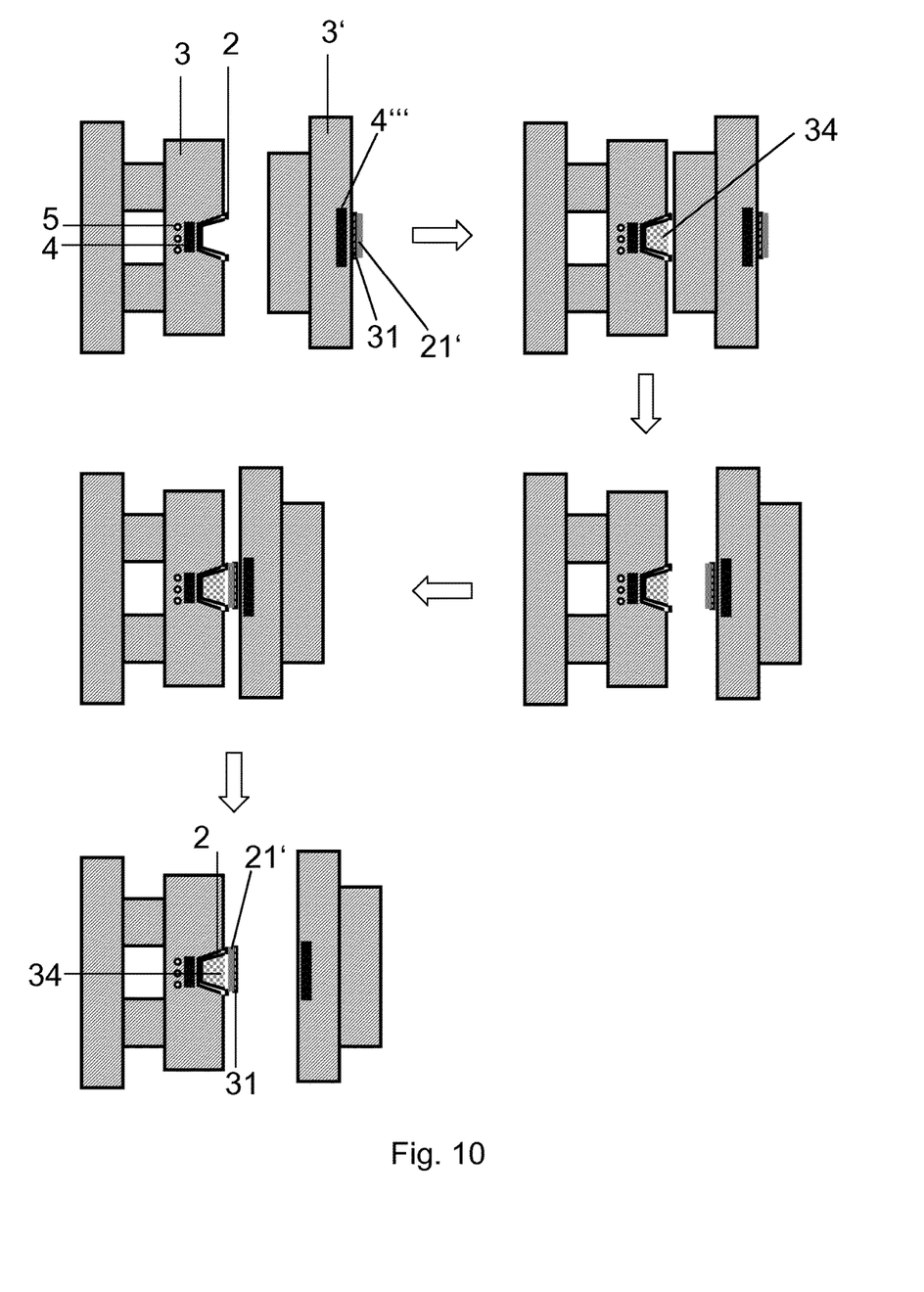
FIG. 10: shows a schematic illustration of an alternative method for closing a hybrid part.

FIGS. 8, 9, and 10 visualize elements and method steps for covering a component 2 with a sheet-metal cover 31 which is coated with an adhesive layer 21'.

Here, the coated sheet-metal cover 31, using a transfer device 33, is pressed onto a component 2 which is laid up in the cavity of a tool 3, and is transferred (FIG. 8). Temperature adjustment in the tool 3 is performed by way of the heating unit 4 and the cooling unit 5. The component 2 has an adhesive layer 21' and may be filled with a plastics material and/or have one or a plurality of plastics-material ribs (not shown) which have been introduced by means of the element of the tool 3'. The transfer device has a heating unit 4". An external heat source (not shown) may likewise be provided.

Alternatively, the tool 3' additionally has a contact face for the sheet-metal cover 31 which is coated with the adhesive layer 21' (FIG. 9). The temperature in the tool 3 is adjustable by means of the heating installation 4 and the cooling installation 5. The tool 3' in relation to the tool 3 is in particular laterally movable such that the component 2 which is coated with an adhesive layer (not shown) is initially filled with a plastics material 34, or such that plastics-material ribs are incorporated. The coated sheet-metal cover 31 is subsequently transferred onto the component 2. The tool 3' in the region of the contact face additionally has a heating unit 4'''. Alternatively, an external heating source (not shown) may also be provided.

Alternatively, the tool 3' is designed as a turning plate and, on a side that faces away from the cavity of the tool 3, has a contact face for the sheet-metal cover 31 which is coated with the adhesive layer 21' (FIG. 10). The temperature in the tool 3 is adjustable by means of the heating installation 4 and of the cooling installation 5. Upon a plastics material 34 in particular in the form of plastics-material ribs having been introduced into the coated component 2, the tool 3' is aligned such that the sheet-metal cover 31 which is coated with an adhesive layer 21' is made mutually congruent with the component 2. Transfer of the sheet-metal cover 31 onto the component 2 is performed accordingly. The tool 3' in the region of the contact face additionally has a heating unit 4'''. Alternatively, an external heating source (not shown) may also be provided.

The invention claimed is:

1. A method for production of hybrid parts, the method comprising the following steps:
providing a component;
providing a tool;
providing at least one press pistil;
providing at least one adhesive layer on the press pistil;
placing the component in the tool;
heating the tool or heating the component prior to placing the component in the tool;
pressing the adhesive layer onto the component in the tool to enable transfer and adhesion of the adhesive layer to the component;
closing the tool;
introducing a plastics material into the tool;
using the adhesive layer to bond the plastics material to the component; and
removing the hybrid part from the tool.

2. The method according to claim 1, wherein the component is pre-formed.

3. A method for producing a hybrid part, the method comprising:
providing a component;
providing a tool;
providing at least one press pistil;
providing at least one adhesive layer on the press pistil;
placing the component in the tool;
prior to placing the component in the tool, at least one of heating the tool or heating the component;
pressing the adhesive layer onto the component in the tool to enable adhesion of the adhesive layer to the component;
closing the tool;
introducing a plastics material into the tool;
using the adhesive layer to bond the plastics material to the component;
removing the hybrid part from the tool; and
using a metal element as the component.

4. The method according to claim 1, wherein the adhesive layer is provided as a contour of a three-dimensional component.

5. The method according to claim 1, wherein the component is produced by at least one of punching, bending, forming, and drawing.

6. The method according to claim 1, wherein the component is pre-treated.

7. The method according to claim 1, wherein the press pistil has at least one vacuum bore which enable suctioning of the adhesive layer.

8. The method according to claim 1, wherein adhesion of the adhesive layer to the component is enabled by temporary fixing.

9. The method according to claim 1, wherein the tool is temperature controlled during introducing of the plastics material.

10. The method according to claim 1, wherein at least one of the component and the adhesive layer, prior to an injection-molding procedure, is heated by one of infrared radiation, induction, hot air or high-frequency radiation.

11. The method according to claim 1, wherein the adhesive layer is single-layered or multi-layered.

12. The method according to claim 1, wherein the adhesive layer has latently reactive groups.

13. The method according to claim 1, wherein the adhesive layer is applied onto a transfer carrier.

14. The method according to claim 1, wherein the adhesive layer has a thickness of from 1 µm to 2000 µm.

15. The method according to claim 1, wherein a layer of the adhesive layer, that faces the component, is made using a material selected from the group consisting of: polyolefins;

polyimide; polyurethane; phenolic resin; polyester; ethylene vinyl acetate, ethylene vinyl alcohol, Ionomers, acrylates, silanes and epoxides.

16. The method according to claim 1, wherein a layer of the adhesive layer, that faces the press pistil, is made from a material selected from the group consisting of: polyolefins; polyamide; thermoplastic polyurethane (TPU), polybutylene terephthalate (PBT), polyphtalamide (PPA), polycarbonate (PC), acrylonitrile butadiene styrene (ABS), polyether ether ketone (PEEK), polyoxymethylene (POM), acrylonitrile styrene acrylate (ASA) and styrene acrylonitrile resin (SAN).

17. The method according to claim 1, wherein a layer of the adhesive layer, that faces the component, has an adhesion to the component such that the adhesive layer may be transferred onto the component with a contact pressure time of 0.1 to 60 seconds and at a pressure of 0.001 to 100 bar.

18. A method for producing a hybrid part, the method comprising:

providing component;
providing a tool;
providing at least one press pistil;
providing at least one adhesive layer on the press pistil;
placing the component in the tool;
prior to placing the component in the tool, at least one of heating the tool or heating the component;
pressing the adhesive layer onto the component in the tool to enable adhesion of the adhesive layer to the component;
closing the tool;
introducing a plastics material into the tool;
using the adhesive layer to bond the plastics material to the component;
removing the hybrid part from the tool; and
forming the hybrid part as a back injection-molded hybrid part which is covered with a coated sheet-metal cover.

* * * * *